(12) United States Patent
Prandi

(10) Patent No.: US 12,714,087 B2
(45) Date of Patent: Aug. 25, 2026

(54) SPRAYING MACHINE

(71) Applicant: Santiago Miguel Prandi, Barrio Dean Funes (AR)

(72) Inventor: Santiago Miguel Prandi, Barrio Dean Funes (AR)

( * ) Notice: Subject to any disclaimer, the term of this patent is extended or adjusted under 35 U.S.C. 154(b) by 218 days.

(21) Appl. No.: 18/594,235

(22) Filed: Mar. 4, 2024

(65) Prior Publication Data

US 2024/0292825 A1 Sep. 5, 2024

Related U.S. Application Data

(60) Provisional application No. 63/488,331, filed on Mar. 3, 2023.

(51) Int. Cl.

| | |
|---|---|
| ***A01M 7/00*** | (2006.01) |
| ***A01C 23/00*** | (2006.01) |
| ***A01C 23/04*** | (2006.01) |
| ***A01G 25/09*** | (2006.01) |
| ***B05B 1/20*** | (2006.01) |
| ***B05B 15/40*** | (2018.01) |
| ***B05B 15/658*** | (2018.01) |

(52) U.S. Cl.

CPC ......... *A01M 7/0089* (2013.01); *A01C 23/007* (2013.01); *A01C 23/047* (2013.01); *A01M 7/0032* (2013.01); *B05B 1/20* (2013.01); *B05B 15/40* (2018.02); *B05B 15/658* (2018.02)

(58) Field of Classification Search

CPC . A01M 7/0089; A01M 7/0032; A01G 25/092; A01G 25/16; A01C 23/007; B05B 15/68

See application file for complete search history.

(56) References Cited

U.S. PATENT DOCUMENTS

| | | | | |
|---|---|---|---|---|
| 3,680,778 A * | 8/1972 | Sisson | A01G 25/092 239/233 |
| 3,901,442 A * | 8/1975 | Chapman | A01G 25/092 239/728 |
| 4,277,026 A * | 7/1981 | Garvey | A01G 25/092 239/727 |
| 5,678,771 A * | 10/1997 | Chapman | A01G 25/092 239/727 |
| 6,666,384 B2 * | 12/2003 | Prandi | A01G 25/16 239/69 |
| 6,820,828 B1 * | 11/2004 | Greenwalt | A01C 23/042 239/726 |
| 8,720,803 B1 * | 5/2014 | Standley | B05B 7/04 239/722 |
| 9,363,956 B1 * | 6/2016 | Standley | B05B 9/06 |
| 11,547,067 B2 * | 1/2023 | Rempe | A01G 25/092 |
| 12,076,734 B2 * | 9/2024 | Bharatiya | B05B 15/68 |

(Continued)

*Primary Examiner* — Joseph A Greenlund

(74) *Attorney, Agent, or Firm* — Greer, Burns & Crain, Ltd

(57) ABSTRACT

A spraying machine for application of treating liquids to cultivated fields, the machine including one span having a proximal end, that is a pivot point, and a distal end and including a plurality of span sections, with each span section having one electric motor control valve assembly and a plurality of nozzles arranged along each span section in a pattern such that the nozzles in a span section close to the proximal end of the span are closer to each other as compared to the nozzles in a span section towards the distal end of the machine.

11 Claims, 6 Drawing Sheets

(56) References Cited

U.S. PATENT DOCUMENTS

| | | | | |
|---|---|---|---|---|
| 2002/0066810 | A1* | 6/2002 | Prandi | A01G 25/16<br>239/69 |
| 2011/0017850 | A1* | 1/2011 | Waybright | A01G 25/092<br>239/728 |
| 2017/0105370 | A1* | 4/2017 | Abts | G05B 15/02 |
| 2022/0030785 | A1* | 2/2022 | Miller | H04Q 9/00 |
| 2022/0117192 | A1* | 4/2022 | Delgado | E04H 17/06 |
| 2024/0074366 | A1* | 3/2024 | Santelman | A01G 25/092 |
| 2024/0292825 | A1* | 9/2024 | Prandi | A01M 7/0032 |
| 2024/0381821 | A1* | 11/2024 | Asiskovich | A01G 9/247 |

* cited by examiner

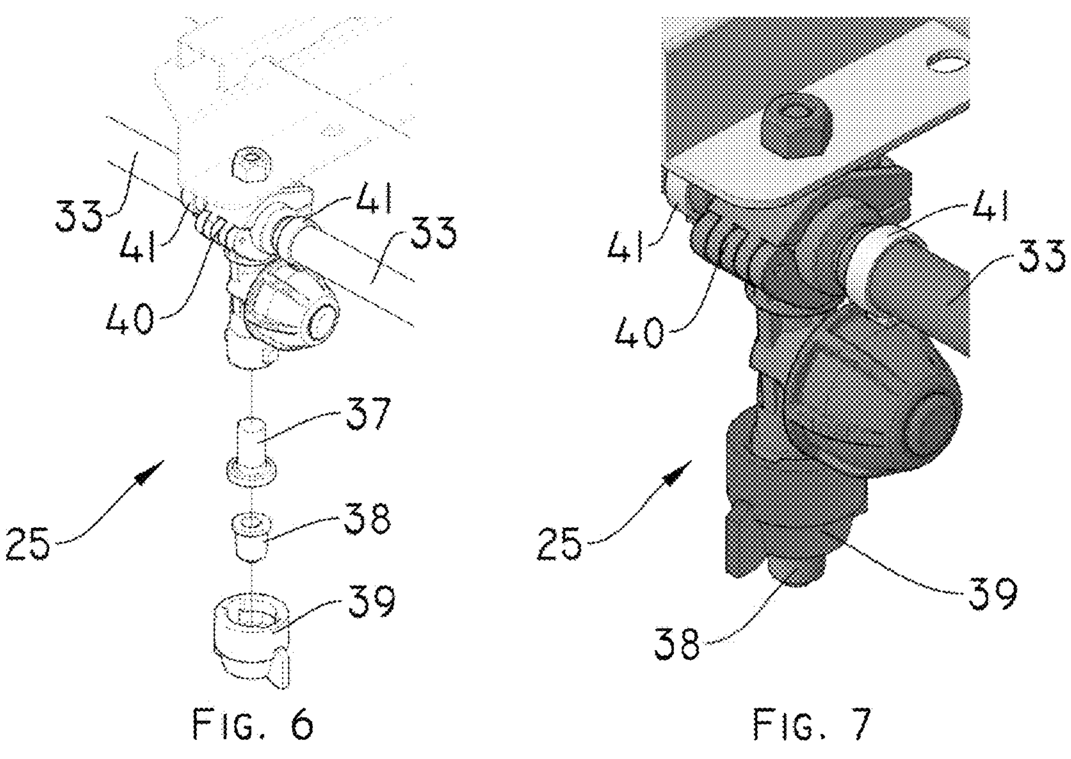
FIG. 6
FIG. 7
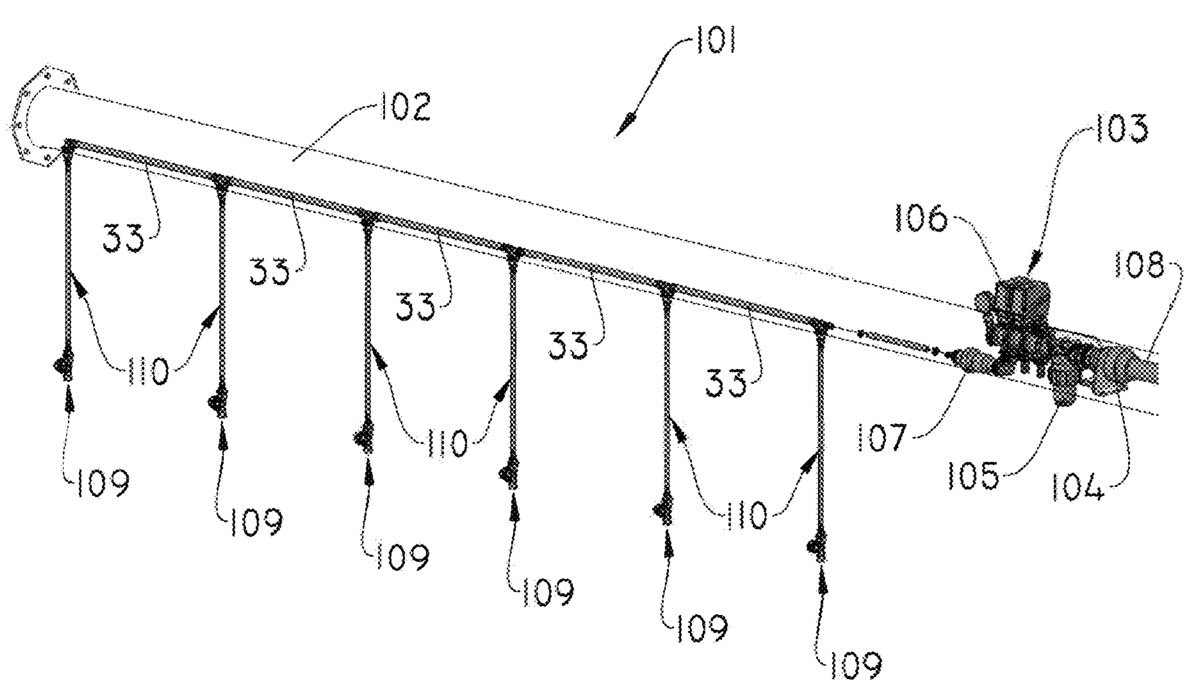
FIG. 8

SPRAYING MACHINE

RELATED APPLICATION

This application is a Non-Provisional of, and claims 35 U.S.C. 119 priority from U.S. Provisional Application Ser. No. 63/488,331 filed Mar. 3, 2023, the entire contents of which are incorporated by reference herein.

BACKGROUND

Field of the Invention

The present invention relates to the field of machinery, devices, apparatuses and arrays used in agro-industry, greenhouses, particularly the invention refers to a spraying machine and more particularly to a self-propelled spraying machine, of the pivot or linear type, for agricultural operations, with a plurality of span sections, with each section having a plurality of spraying nozzles for application of variable doses of a desired liquid, such as phytosanitary products and liquid fertilizer, with the spray nozzles being arranged according to a novel array pattern.

Description of Prior Art

Generally, the main types of self-propelled spraying machines that may operate with a spraying system are central pivot machines and linear machines which comprise a plurality of span sections with each section having spray nozzles.

One of said machines may be the one disclosed in U.S. Pat. No. 6,666,384, to the same inventor of the present application, which teaches an apparatus and method for the application of phytosanitary liquids on a field, wherein the apparatus comprises a plurality of spraying units including nozzles for the application of an adjustable amount of liquid on the field, with all the nozzles aligned to keep the same distance between them, that is they are equidistant. Driving devices are provided to move the spraying or irrigation unit on the ground, a system for supplying the liquid to the nozzles and a control circuit to control the functioning of nozzles in order to apply variable doses to the irrigation unit nozzles, the control circuit comprising a computer unit for the receipt of introduced data and to operate the control circuit, and being a control module independently on each irrigation unit, a plurality of sensors for detecting various parameters of the unit and an interface module connecting the independent control modules and the computer unit there between. Even though the machine of Document U.S. Pat. No. 6,666,384 has shown to function correctly in practice, the use of independent modules makes control difficult and the equal spacing between nozzles limited the uniformity of the application.

As for the methods known for the application of agrochemical products, we find the use of self-propelled machines or sprayers. At least one person is needed to operate the machinery exposing the individual to products that are toxic and harmful to human beings. These machines in turn generate an undesirable compaction on soil and damage crops as they run the field with their wheels. They are also unable to perform the control on all crop stages since they are developed at height and in repeated opportunities these machines do not have enough space to run on them.

The use of spraying equipment injecting agrochemicals with the water used for irrigation is also a method which is sometimes inaccurate and harmful for environment since the flow of water and chemical products is distributed on ground through the spraying machine sprinklers. When it is used for fertilizers, this method does not show any problem since, even though the distribution of the fertilizer on the surface is not accurate, the application may be deemed acceptable. However, for the use of variable doses requiring a precise control in all sprinklers on small areas, the method is not acceptable. In turn, the dissolution of the water rate needed in this method is unacceptable for most of agrochemicals such as herbicides, fungicides, insecticides, etc.

Therefore, it would be convenient to have an improved system for the application of phytosanitary products and liquid fertilizer with a nozzle array that provides a better control over the sprayed phytosanitary products, and to cover in a better pattern the areas under irrigation.

SUMMARY

Therefore, it is an object of the present invention to provide a new spraying machine with a novel installation and array of spraying nozzles for spraying a desired area in a more precise and exact manner, the machine being of the pivot or linear type.

It is another object of the invention to provide a spraying machine for application of treating liquids to a desired portion of a field to be treated with the liquids, the machine comprising:

at least one span having a proximal end and a distal end and comprising a plurality of span sections, with each span section having at least one electric motor control valve connected to a plurality of spray nozzles arranged along each span section in a pattern according to the following formula:

$$S_1 = \frac{S_0 \times RS_X S_0}{(RS_X S_0 + S_0)}$$

$$S_2 = \frac{S_0 \times RS_X S_0}{(RS_X S_0 + S_0 + S_1)}$$

$$S_n = \frac{S_0 \times RS_X S_0}{(RS_X S_0 + S_0 + S_1 + \ldots + S_{n-1})}$$

Wherein:

$RS_xS_0$: Distance between the center of the pivot and the first spray nozzle of the section chosen, $RS_xS_0$=LRDU: for the overhang section, S: the separation between nozzles along the section, $S_0$: is the maximum separation for the two nozzles closer to the pivot point, and $S_n$: is the separation between the two nozzles farthest from the pivot point.

It is another object of the invention to provide a sprayer self-propelled pivot machine, wherein each spray nozzle of each section of span of each span applies a variable amount of phytosanitary product to the surface at a given time based on a countdown D that follows the following formula:

$$D = V(LRDU) \times (d \div LRDU \times t)$$

Wherein:

D: countdown to the shooting distance,

V(LRDU): Speed of the last driving unit of the irrigation machine,

LRDU: Distance from the pivot point to the last drive unit of the irrigation machine, d: Distance from the pivot point to the first spray nozzle of the section chosen for the calculation, and t: Unit of time that the software takes as a reference, normally 1 second.

It is another object of the present invention to provide a spraying machine for application of treating liquids to a desired portion of a field to be treated with the liquids, the machine comprising at least one span having a proximal end, that is a pivot point, and a distal end and comprising a plurality of span sections, with each span section having at least one electric motor control valve connected to a plurality of nozzles arranged along each span section in a pattern according to variable separation distances, wherein the nozzles in a span section close to the proximal end of the span are closer to each other as compared to the nozzles in a span section towards the distal end of the machine.

BRIEF DESCRIPTION OF THE DRAWINGS

For better clarity and understanding of the object of the present invention, the same has been illustrated in various figures, in which the invention has been represented in one of the preferred embodiments, all as an example.

FIG. 6 shows an exploded view of a spray nozzle according to the invention;

FIG. 7 shows a perspective view of a spray nozzle according to the invention;

FIG. 8 shows a schematic perspective view of the arrangement of the spray nozzles according to a second preferred embodiment;

DETAILED DESCRIPTION

Referring now to the present invention, it can be seen that it consists of a novel self-propelled spraying machine that can be of the pivot or linear type and that has a plurality of spray nozzles distributed and positioned according to a formula developed for the invention that contemplates the distances of each spray nozzle from each span section of each span, allowing exact spraying both in quantity and in sprayed ground area. It is highlighted that the novel arrangement of the nozzles according to the calculated pattern can be used in any type of self-propelled spraying machine known in the art, preferably being that disclosed in U.S. Pat. No. 6,666,384 of the same owner and which is incorporated by reference. Herein, but not limiting to the invention since the novel nozzle arrangement can be used in any type of self-propelled spraying machine.

According to the invention the machine may be of the pivot or linear type and comprises a span having a proximal end and a distal end, if the machine is of the pivot type the proximal end is the pivot point to which reference will be made along this description.

Figure 1:
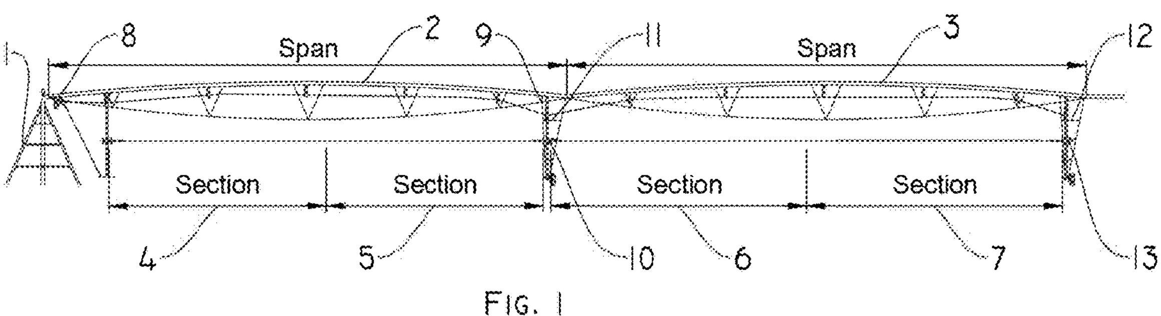
FIG. 1 shows a schematic view of a self-propelled spraying machine according to the present invention.

According to FIG. 1, the spraying machine of the present invention is provided with a pivot tower 1 from which a pair of spans 2 and 3 extend, each of which is sectioned by means of sections span 4, 5 and 6, 7 respectively. Although in the present invention two span 2, 3 have been illustrated with their respective span sections 4, 5, 6 and 7, this does not imply that the invention is limited to said quantities and arrangements, but rather that they may vary according to the distances to be covered.

The span 2 has a proximal end 8 connected to said pivot tower 1 and a distal end 9 connected to a mobile tower 10 that can define a first pivot point 10, while said span 3 has a proximal end 11 connected to said tower mobile 10 and a distal end 12 connected to a mobile tower 13. According to FIGS. 1 and 2, each span 2, 3 is segmented by said span sections 4, 5 and 6, 7 respectively, and each span section 4, 5, 6 and 7 will present a plurality of spray nozzles 14.

Figure 2:
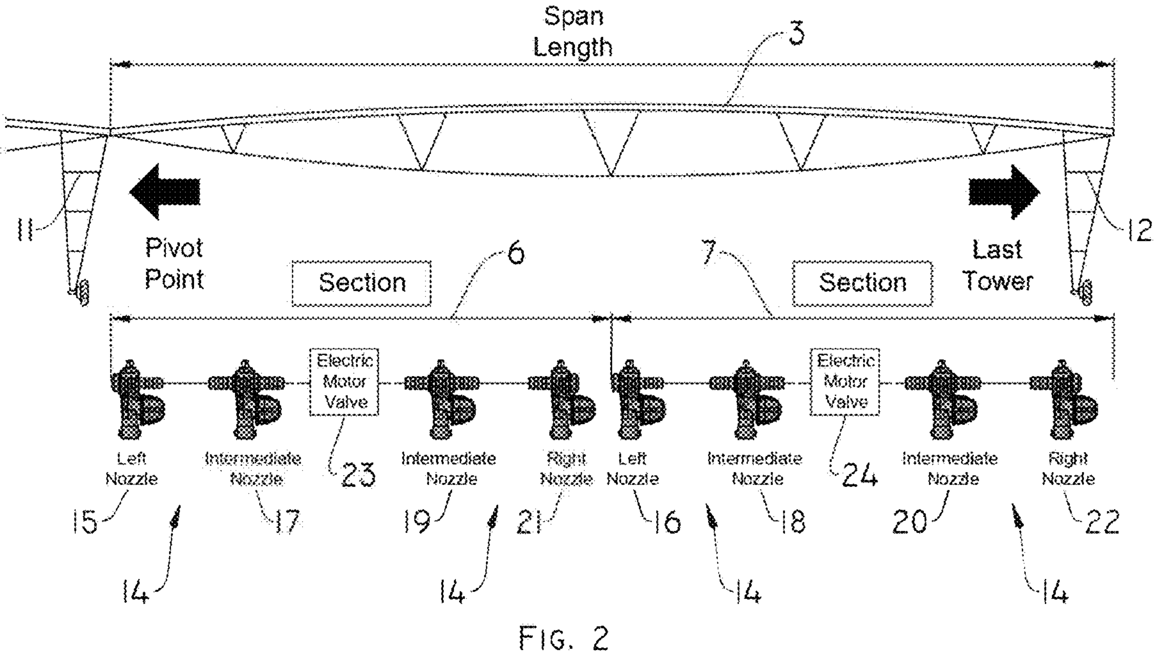
FIG. 2 shows a view of two span sections of the self-propelled sprayer according to the invention, showing the distribution of a plurality of spraying nozzles within said sections.

By way of example, but not limitation, FIG. 2 illustrates said span 3 with its span sections 6, 7 each of which respectively presents a left spray nozzle 15, 16; a left intermediate spray nozzle 17, 18; a right intermediate spray nozzle 19, 20; and a right spray nozzle 21, 22. Likewise, the invention provides an electric motor control valve assembly 23, 24 arranged between each pair of left-right intermediate spray nozzles 17-19 and 18-20 respectively. The electric motor control valve assembly will allow control of the flow rate that each spray nozzle will receive according to the needs of each one of them based on the distance and area to be sprayed.

Figure 3:
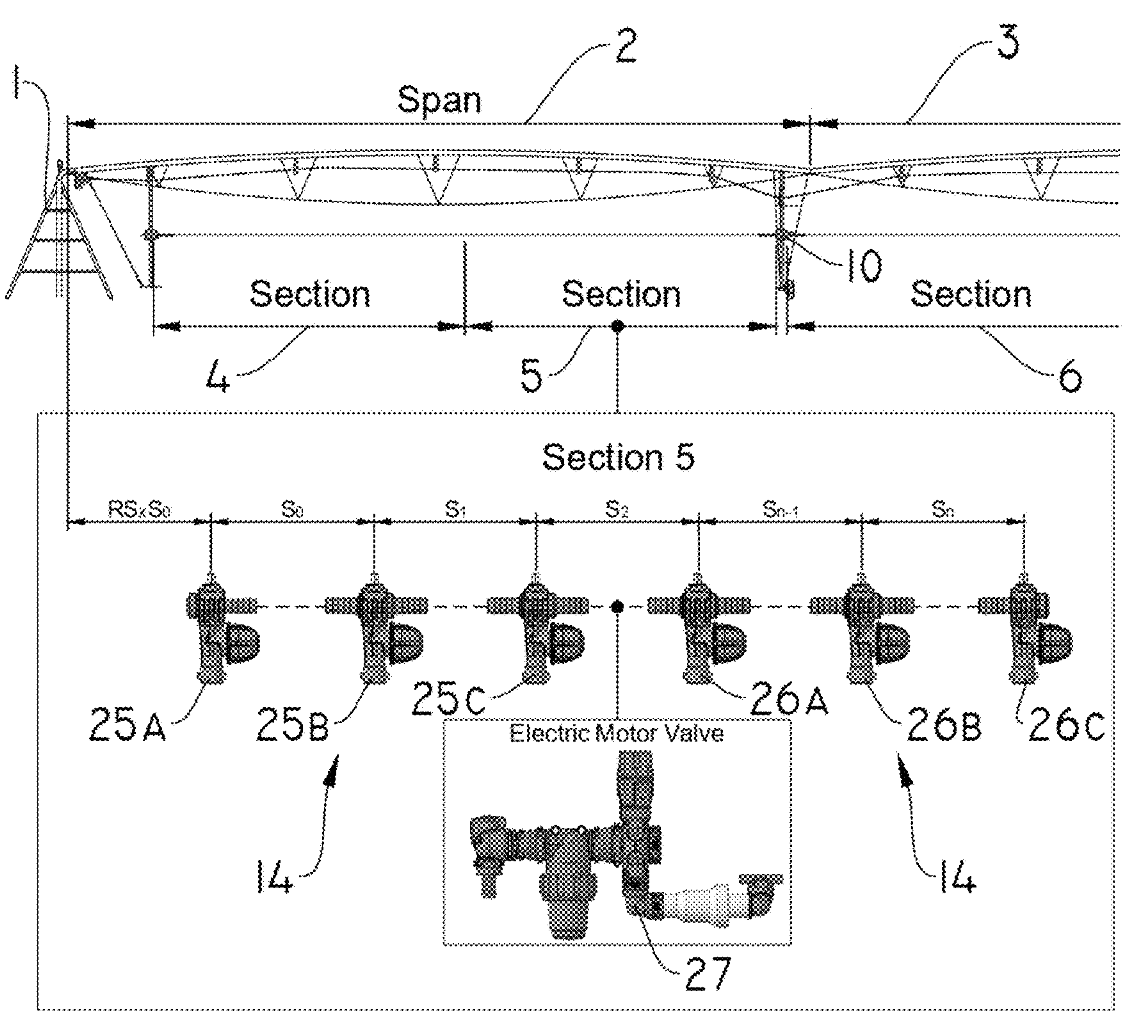
FIG. 3 shows a schematic view of a span section of the spraying machine and the distribution of the spray nozzles within it, whose separation will be calculated according to a formula that will give a pattern of lengths according to the location of said section.

According to FIG. 3, and by way of example but not limitation for the invention, the section of span 5 of said span 2 is detailed, which has a plurality of spray nozzles 14 that comprise at least one left spray nozzle 25*a*, four intermediate spray nozzles 25*b*, 25*c*, 26*a*, 26*b*, and at least one right spray nozzle 26*c*, separated by means of an electric motor control valve assembly 27. Although left, intermediate and right spray nozzles are mentioned, this does not implies a limitation to the invention since said definitions are merely to help with the understanding of the object of the present invention and may vary without any inconvenience.

It should be understood that said spray nozzles 14 of both span 2 and span 3 are constructively identical and have only been indicated differently for exemplary purposes. For their part, and like the spray nozzles 14, said sets of electric motor control valve assemblies 23, 24 and 27 are also constructively identical. Therefore, it is understood that when describing one of the spray nozzles 14 we are describing the other spray nozzles 14 and that when describing one of the electric motor control valve assemblies 23, 24 and 27 we are describing the other of electric motor control valve assemblies.

Figure 4:
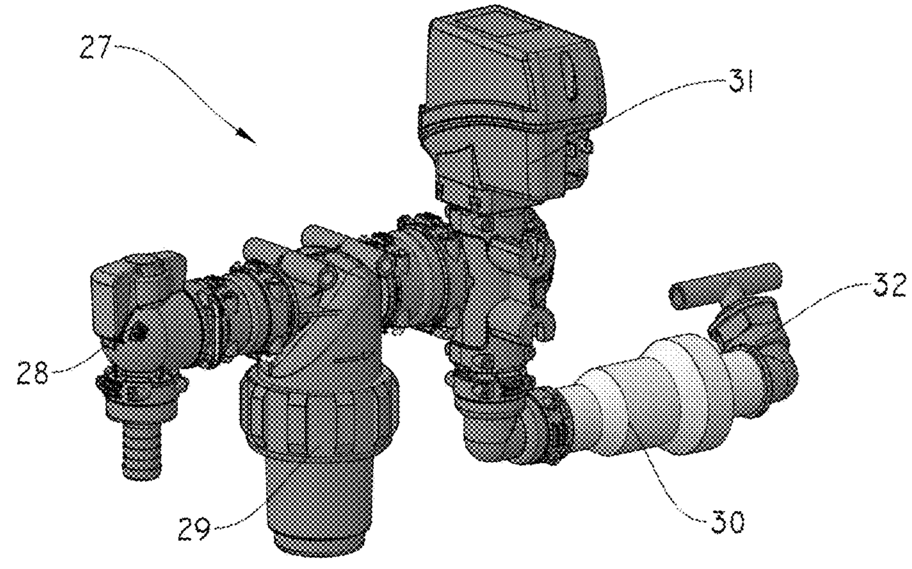
FIG. 4 shows a perspective view of an electric motor control valve assembly in accordance with the invention.
Figure 5:
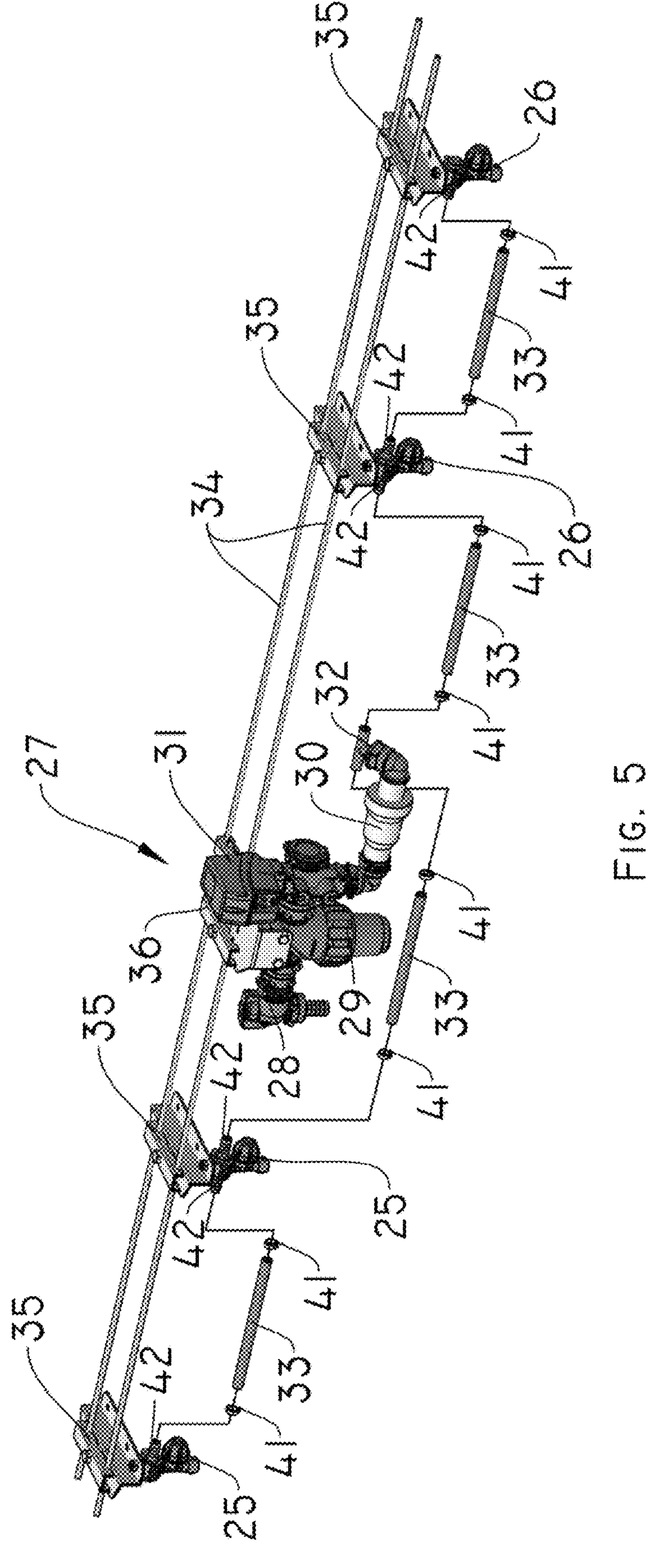
FIG. 5 shows a schematic perspective view of the electric motor control valve arrangement in conjunction with a spray nozzle arrangement according to a first preferred embodiment of the present invention.
Figure 9:
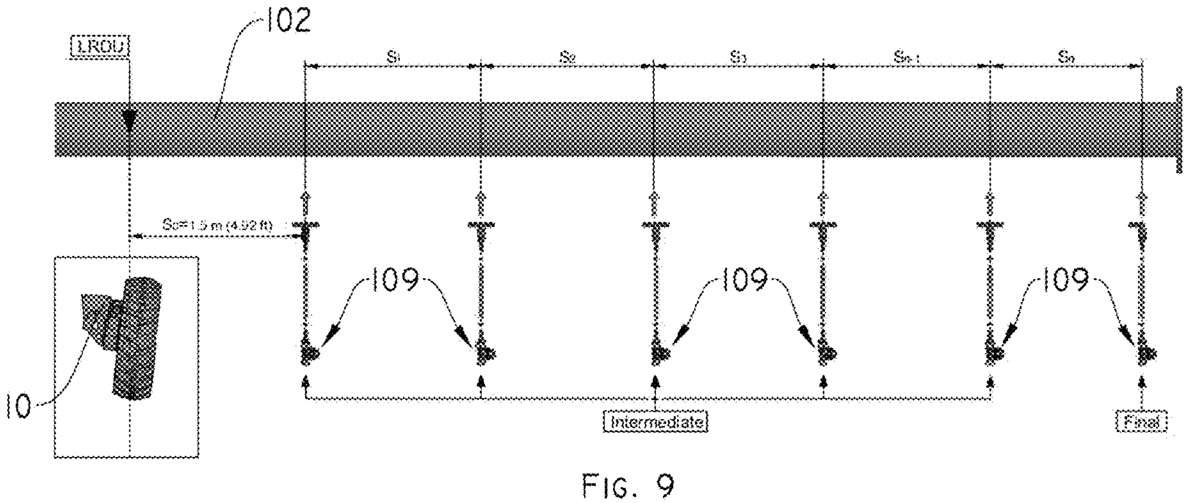
FIG. 9 shows a schematic view of the nozzle arrangement according to FIG. 8, the distribution of which will be calculated based on a pattern of distances according to the location of the section.
Figure 10:
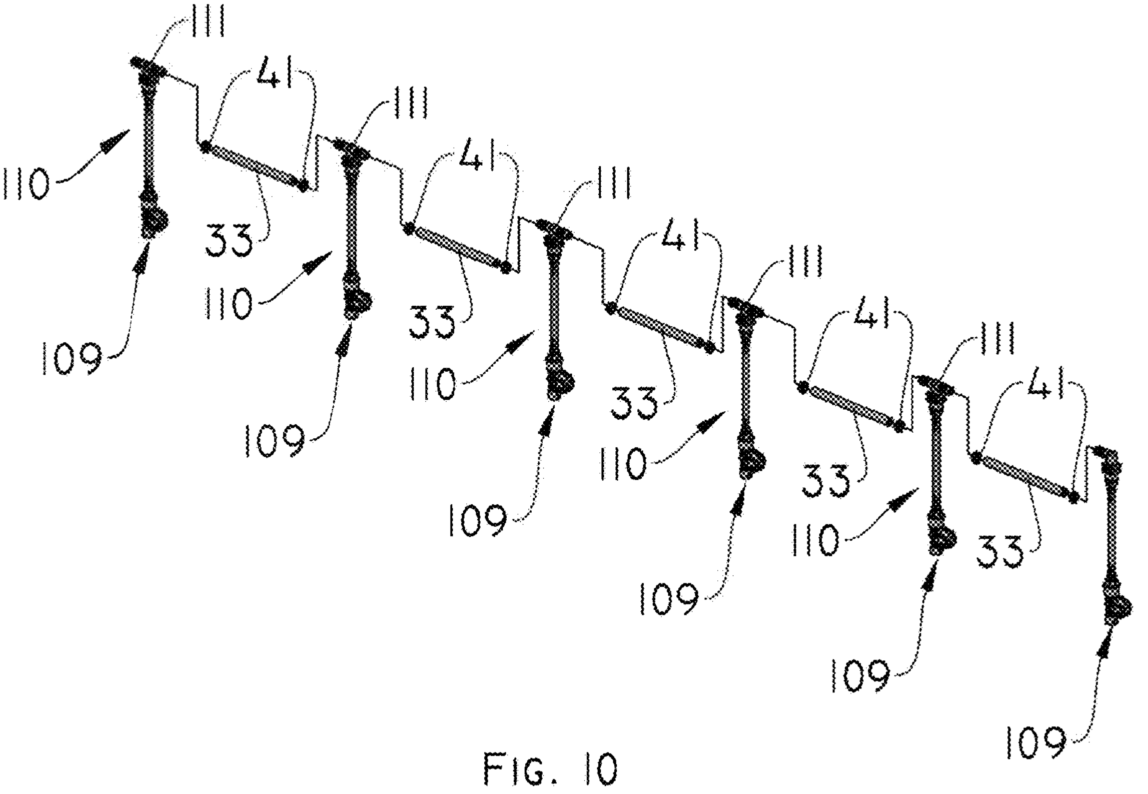
FIG. 10 shows a perspective view of the spray nozzles in connection with a linking line for feeding the product to be sprayed.

According to FIG. 4, and by way of example but not limitation, said electric motor control valve assembly 27 comprises a manual valve 28, a mesh filter 29, a pressure regulator 30, an electric motor control valve 31 and a valve power connector 32 which connects to a linking line 33 as best illustrated in FIG. 5.

According to FIG. 5, the linking line 33 is segmented so as to connect between adjacent spray nozzles 25 and 26 and with said electric motor control valve assembly 27. In a first preferred embodiment, said spray nozzles 25, 26 and the electric motor control valve assembly 27 are mounted on a pair of support cables 34 through respective supports 35 and 36 respectively. The support cables 34 extend along the spans 2, 3 and can be supported by respective supports as described and illustrated in U.S. Pat. No. 6,666,384 of the same owner and whose reference is included herein.

As shown in FIGS. 6 and 7, said spray nozzles 25, 26 comprise a nozzle filter 37, a spray nozzle 38 and a nozzle cover 39. Likewise, above each spray nozzle 25, 26 has a nozzle feed connection 40 provided of respective nozzle connection nipples 42 for connecting the corresponding ends of the phytosanitary product linking lines 33, which are fixed through respective clamps 41.

It is highlighted that the phytosanitary product pipeline 108 extends along spans 2, 3 and is connected to a phytosanitary product tank (not illustrated) whose layout, operation and construction may be similar to that disclosed in U.S. Pat. No. 6,666,384. Through said phytosanitary product pipeline, each spray nozzle 14 of the span sections 4, 5, 6 and 7 is fed and in turn to said electric motor control valve assemblies 23, 24 and 27.

As mentioned above, one of the novel differences of the present invention lies in the novel arrangement of the spray nozzles 14 within each span section based on a mathematical calculation. To do this, FIG. 3, in each of these independent span sections 4, 5, 6, and 7, the spraying nozzles 14 are arranged in a manner that the separation between each other is given by the formula:

$$S_1 = \frac{S_0 \times RS_X S_0}{(RS_X S_0 + S_0)}$$

$$S_2 = \frac{S_0 \times RS_X S_0}{(RS_X S_0 + S_0 + S_1)}$$

$$S_n = \frac{S_0 \times RS_X S_0}{(RS_X S_0 + S_0 + S_1 + \ldots + S_{n-1})}$$

Wherein:

$RS_xS_0$: Distance between the center of the pivot tower 1 and the first spray nozzle 14 of the span section chosen. Wherein, in the case of FIG. 3, the first spray nozzle 14 is the spray nozzle 25*a;*

S: the separation between spraying nozzles 14 along the span section. In the case of FIG. 3, it is the separation distance of the spray nozzles 25 from each other and the separation distance of the spray nozzles 26 from each other;

$S_0$: is the maximum separation for the two spray nozzles 14 closer to the pivot point. In this case, the pivot tower 1 is taken as the pivot point, with the maximum separation between the spray nozzles 25*a* and 25*b*; and $S_n$: is the separation between the two nozzles farthest from the pivot point. In this case, taking the pivot tower 1 as the pivot point, the separation is between the spray nozzles 26*b* and 26*c*.

This way, in each span section 4, 5, 6, 7, the spray nozzles 14 are spaced from each other following a mathematical relationship that allows each spray nozzle 14 to fire, i.e. to apply a desired product, on respective surfaces having equivalent or same area for applied product. Each span section 4, 5, 6, 7, in this way, defines its relative location on the machine. It can only be changed if the separation between them is recalculated. According to the invention, the spacing between the spray nozzles 14 increases along the span sections in machine, from the center to the outer end of the machine. In other words, the spray nozzles 14 in a span section close to the pivot point of the machines are closer to each other as compared to the spray nozzles 14 in a span section towards the outer end of the machine. As an example, a span section of the same length located at the outer end of the machine, let us say a 400 m long machine, will have 18 spray nozzles 14, while one span section close to the center or the pivot point of the machine will need 22 spray nozzles 14 to reach the same section length.

According to FIGS. 8 to 11, in a second preferred embodiment for the Over Hang, the invention provides an Over Hang assembly 101 fixed to pivot machine pipeline 102 which is provided with an electric motor control valve assembly 103 comprising a valve connector 104, a mesh filter 105, an electric motor control valve 106, and a pressure regulator 107, wherein said valve connector 104 is connected to a supply pipeline of phytosanitary product 108 connected in turn with the phytosanitary product tank, as described, but not limited, in U.S. Pat. No. 6,666,384, while said pressure regulator 107 of Valve 106 is connected to said phytosanitary product linking line 33 that feeds phytosanitary product, but is not limited to, a plurality of spray nozzles 109 that are connected to respective downpipes 110.

Figure 11:
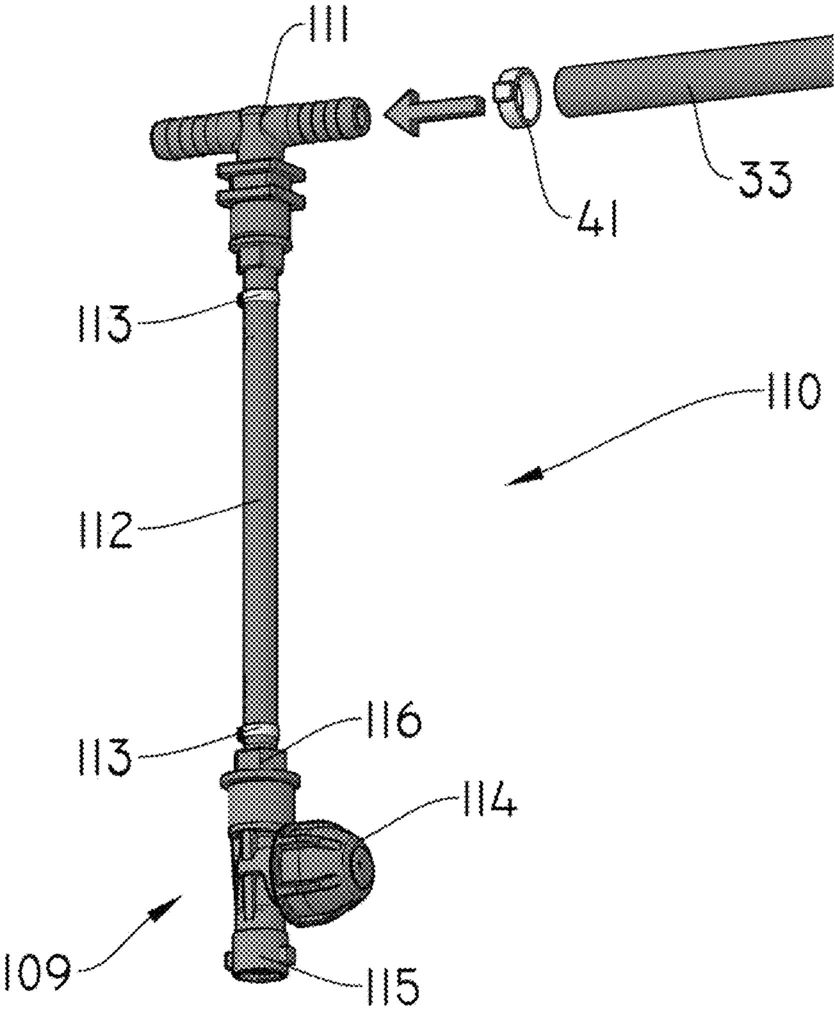
FIG. 11 shows a detail view of the connection between the tie line and one of the spray nozzles.

According to FIG. 11, each downspout 110 comprises a downspout T-nipple 111 for connection with the phytosanitary product linking line 33 which is fixed by means of a respective clamp 41, a pipe, pipe or downspout hose 112 connected above to said downpipe 111 while below it is connected to a corresponding spray nozzle 109 and fixed thereto by means of respective clamps 113. Each spray nozzle 109, like the spray nozzles 14, comprises a nozzle check valve 114, a spray nozzle (not illustrated), a nozzle body 115 and above a nozzle feed connection 116 which is connected to the lower end of said pipe, pipe, downspout hose 112.

According to this second preferred embodiment, in the overhang section, the spraying nozzles 109 are arranged in a manner that the separation between each other is given by the formula:

$$S_1 = \frac{S_0 \times LRDU}{(LRDU + S_0)}$$

$$S_2 = \frac{S_0 \times LRDU}{(LRDU + S_0 + S_1)}$$

$$S_n = \frac{S_0 \times LRDU}{(LRDU + S_0 + S_1 + \ldots + S_{n-1})}$$

Wherein:

LRDU: Distance between the center of the pivot and the last tower of the irrigation system. Data obtained from the irrigation system;

S: the separation between spraying nozzles 109 along the span section;

$S_0$: is the maximum separation for the two spraying nozzles closer to the pivot point;

$S_n$: is the separation between the two spraying nozzles farthest from the pivot point.

This way, in each over hang section the spray nozzles 109 are spaced from each other following a mathematical relationship that allows each spray nozzle 109 to fire, i.e. to apply a desired product, on respective surfaces having equivalent or same area for applied product.

The machine of the invention has said main pipeline of phytosanitary product 108 that runs along the entire length of the irrigation machine ending in an electric motor control valve assembly 103 to feed the overhang section, allowing the liquid to be manually diverted to a final tank (not shown). Before the final electric motor control valve 106, a pressure sensor (not shown) is installed so that it returns +12 VDC to the control panel (not shown) through another independent wire (not shown) and the control logic knows that the minimum operating pressure is there. Each pivot section has at least one independent liquid section connected to the main line of phytosanitary product by a manual valve, a mesh filter, a pressure regulator and the electric motor control valve. Although the control panel has not been illustrated, it is positioned in a head of the pivot tower 1 as can be found described in U.S. Pat. No. 6,666,384. Likewise, it is understood that all logical operations of the machine of the invention are carried out by respective electronic control systems known in the art.

The decision to open the electric motor control valve of each section is taken when the section has traveled the distance equivalent to the necessary coverage and overlap of the spraying nozzle installed in the span section. In the control panel, a countdown (D) that is subtracted from that distance if only the speed of the last drive unit of the irrigation machine V (LRDU) is taken as a variable for the calculation. Since it has continuous motion motors, the calculation is done with the following formula:

$$D = V(LRDU) \times (d \div LRDU \times t)$$

Wherein:

D: countdown to the shooting distance,

V(LRDU): Speed of the last driving unit of the irrigation machine,

LRDU: Distance from the pivot point to the last drive unit of the irrigation machine, d: Distance from the pivot point to the spray nozzle of the section chosen for the calculation, t: Unit of time that the software takes as a reference, normally 1 second.

A more precise way of calculating the countdown D when the motors of the irrigation machine have intermittent motion motors, is to use the information of both towers between which is the chosen section and to use the formula for each independent movement and the combination of both. Thus, there is a combined countdown for the countdown of the individual movements of both towers. Intermediate towers could even be used to reduce the number of wires reporting tower movements to the control panel. It is even possible to use the movement signal of the last tower present in the control panel without the need for additional wires that report the individual movements of the irrigation equipment towers, with the consequent deviation resulting in the countdowns. This because the only one calculation signal that is being taken is the movement of the last motor unit of the irrigation machine, thus ignoring the intermittent movements of the interior sections that depend on the correct alignment of the irrigation machine.

As mentioned above, the irrigation machine of the invention has a single control panel installed at the pivot point. This control panel has an HMI to be able to interact with the user and a PLC to be able to carry out all the processes that may be needed to coordinate the different shots necessary to carry out the application of agrochemicals and liquid fertilizers on the crop.

The control panel receives an electric cable (not shown) from the machine containing a plurality of wires. Two of the wires are for the voltages +12 V DC and 0 VDC to power the different electric motor control valves and be used as a signal to activate the control panel relays (not shown), turning them on or off depending on whether the towers are moving or not. Another wire (not shown) is used so that the control panel, through the corresponding relay, knows when the pressure sensor (not shown) located at the end of the main line of phytosanitary product has the minimum pressure required to ensure that the spray nozzles of the different sections can work properly. Additionally, the electric cable has another wire (not shown) for an electric motor control valve that is used to turn it on and off. Every time each tower moves, it returns the +12 VDC through an independent wire (not shown) so that the PLC detects that this tower is in motion and thus be able to calculate the countdown and thus be able to determine the moment of firing or triggering or opening the spray nozzles. Although the mentioned wires have not been illustrated, it is understood that any expert in the field would have no problem interpreting that to operate electronic elements, respective wires are required.

Each section has an electric motor control valve that opens when receiving the +12 VDC from a wire and turns off when the +12 VDC is removed. The aforementioned pressure sensor (not shown) is powered by +12 VDC and returns the same +12 VDC to the control panel through its independent wire (not shown) within the same electric cable. In other words, the entire control is carried out throughout the machine by a single electric cable (not shown) that has multiple wires (not shown) to inform the movements of the towers, the signal from the pressure sensor (not shown), feed the electric motor control valves, turns them on and off when necessary. All these operations being done with only +12 VDC. In this way, the need to use communication protocols is avoided, which in this environment are usually susceptible to instability.

In summary, the control panel (not shown) of the invention receives the movement signal of the last driving unit of the irrigation machine from a wire (not shown) present in the control panel and coming from the control panel of the irrigation machine. Alternatively, in the electric cable (not shown) that runs through the system of the invention, independent wires are included so that the movement signals of each tower of the irrigation equipment carry +12 VDC when the towers move, putting that voltage in the corresponding relays in the control panel thus informing the corresponding inputs of the PLC. In this way the composition of movements of each span section is made since it is known between which towers are each of them. The formula used is the same, except that the distance to the turning point is transferred to the immediately preceding or following tower depending on which one is being moved.

Below the control panel is a pressure transducer (not shown) that allows the software to know which pressure in the pump (not shown) is at the beginning of the main line of phytosanitary product. In turn, there is a flowmeter (not shown) that allows knowing the flow of each span section when one wants to determine that they are working correctly and that the electric motor control valve driving each section is opening and closing correctly.

The pressure sensor (not shown) located at the end of the main line of phytosanitary product, always sends the +12 VDC signal through an independent wire to the control panel while the pressure is above the selected minimum value. This makes it possible to check that the main line of phytosanitary product is not broken or that the simultaneity of shots can generate an excessive pressure loss, causing the pressure to be below the working pressure of the pressure regulators that each section has. These pressure regulators are installed to maintain the pressure at a constant value in all the sections regardless of their relative location along the irrigation machine. In turn, it allows the machine to operate on terrain with unevenness that would affect the pressure along the length of the machine.

The objective of this invention is NOT to have communication protocols throughout the machine to inform the signals that are needed for the control loop. Nor is there a need to activate the electric motor control valves that open and close the nozzle assemblies. On the contrary, the objective is to simplify the installation, reduce costs, reduce assembly times and simplify maintenance, thus making its operation extremely simple. To do this, a new arrangement of the spray nozzles is provided that allows the entire surface to be sprayed homogeneously in controlled quantity and section.

Having the control panel at the pivot point, makes the control panel have all the advantages of accessibility, being able to communicate between the control panels in a simple and reliable way.

The applied dose of the liquid (phytosanitary product or others) is adjusted to the desired one in each shot through the time that each span section is kept open. This time can be adjusted individually in each shot and in each span section, thus allowing a variable application of extreme precision, being able to reduce the amount of agrochemicals used and the decision of where to apply them, thus being able to monitor the nutrition of the crop throughout of his life with extreme precision in every pixel of the terrain.

This concept arises from the need to install the machine of the former invention of the same applicant on the overhang of the irrigation machines of the prior art. In those machines, the necessary structures cannot be installed in a manner that the machine can be raised and lowered safely that is why the nozzles are suspended from downpipes that position the nozzles at the correct height above the crop. It should be noted that their separation follows the same criteria as the rest of the sections. This section, called the overhang section, also allows the main line of phytosanitary product to be cleaned when the irrigation machine is irrigating, and this is so because the injection of chemicals may be cut off, leaving the pump to only drive clean water and remove all the chemicals that may have remained in the line. The main line of phytosanitary product can be applied by the overhang section at the same time that the machine is irrigating and the water dilutes the agrochemical so that it does not affect the crop. If the agrochemical does not allow this option, it can be collected through a manual valve located at the beginning of the overhang section in a place of easy access.

In the case of a linear advance machine, the separation of the nozzles is:

$$So = S1 = Sn - 1 = Sn$$

Wherein:

S: the separation between spraying nozzles along the span section, $S_0$: is the maximum separation for the two spraying nozzles closer to the chart of the linear machine, and $S_n$: is the separation between the two spraying nozzles farthest from the chart of the linear machine.

In this way, the self-propelled machine of the invention is constituted and constructed, which allows the spray nozzles to be positioned in each span section exactly based on a formula, thus allowing adequate and exact spraying in both quantity of product and use as the area to be covered by each of said spray nozzles.

While a particular embodiment of the present spraying machine has been described herein, it will be appreciated by those skilled in the art that changes and modifications may be made thereto without departing from the invention in its broader aspects and as set forth in the following claims.

The invention claimed is:

1. A spraying machine for application of treating liquids to a desired portion of a field to be treated with the liquids, the machine comprising:

at least one span having a proximal end defining a pivot point and a distal end and comprising a plurality of span sections, with each span section having at least one electric motor control valve connected to a plurality of nozzles arranged along each span section in a pattern according to the following formula:

$$S_1 = \frac{S_0 \times RS_X S_0}{(RS_X S_0 + S_0)}$$

$$S_2 = \frac{S_0 \times RS_X S_0}{(RS_X S_0 + S_0 + S_1)}$$

$$S_n = \frac{S_0 \times RS_X S_0}{(RS_X S_0 + S_0 + S_1 + \ldots + S_{n-1})}$$

wherein:

$RS_xS_0$: Distance between the pivot point and the first spray nozzle of the section chosen, $RS_xS_0$=LRDU: for the overhang section, S: the separation between nozzles along the section, $S_0$: is the maximum separation for the two nozzles closer to the pivot point; and $S_n$: is the separation between the two nozzles farthest from the pivot point.

2. The spraying machine according to claim 1, wherein each spray nozzle of each span section of each span applies a variable amount of phytosanitary product to the surface at a given time based on a countdown D that follows the following formula:

$$D = V(LRDU) \times (d \div LRDU \times t)$$

wherein:

D: countdown to the shooting distance,

V(LRDU): Speed of the last driving unit of the spraying machine,

LRDU: Distance from the pivot point to the last drive unit of the machine, d: Distance from the pivot point to the first spray nozzle of the section chosen for the calculation, and t: Unit of time that the software takes as a reference, normally 1 second.

3. The spraying machine according to claim 1, wherein in the case of a linear advance machine the separation of the nozzles is:

$$So = S1 = Sn - 1 = Sn$$

wherein:

S: the separation between nozzles along the section, $S_0$: is the maximum separation for the two nozzles closer to the chart of the machine; and $S_n$: is the separation between the two nozzles farthest from the chart of the machine.

4. The spraying machine according to claim 1, wherein as the spans move away from the pivot point, the spray nozzles of each span section are spaced a greater distance from each other without ever exceeding the maximum initial separation.

5. The spraying machine according to claim 1, wherein each spray nozzle comprises a nozzle filter, a spray nozzle, a nozzle cap and above a nozzle feed connection.

6. The spraying machine according to claim 1, wherein each electric motor control valve assembly comprises a mesh filter, a pressure regulator, a valve power connector and a valve with electric motor.

7. The spraying machine according to claim 5, further comprising at least one phytosanitary product linking line which is connected to said spray nozzles and the electric motor control valve, said phytosanitary product linking line being it is segmented and is fixed between adjacent spray nozzles by means of respective clamps.

8. The spraying machine according to claim 6, further comprising at least one phytosanitary product linking line which is connected to said spray nozzles and the electric motor control valve, said phytosanitary product linking line being it is segmented and is fixed between adjacent spray nozzles by means of respective clamps.

9. The spraying machine according to claim 1, further comprising at least one downpipe connected to said main line of phytosanitary product and with a corresponding spray nozzle, where each downpipe has a downpipe T-nipple for connection with the main line of phytosanitary product which is fixed by means of a respective clamp, a pipe, pipe or downspout hose connected at the top to said downspout while at the bottom it is connected to a corresponding spray nozzle and fixed to them by means of respective clamps.

10. The spraying machine according to claim 7, further comprising at least one downpipe connected to said main line of phytosanitary product and with a corresponding spray nozzle, where each downpipe has a downpipe T-nipple for connection with the main line of phytosanitary product which is fixed by means of a respective clamp, a pipe, pipe or downspout hose connected at the top to said downspout while at the bottom it is connected to a corresponding spray nozzle and fixed to them by means of respective clamps.

11. The spraying machine according to claim 1, wherein if the machine is of the pivot type the proximal end of the span is the pivot point.

* * * * *